Aug. 18, 1942.  A. W. WIGGLESWORTH  2,293,375
AUTOMATIC BRAKE
Filed May 17, 1941  3 Sheets-Sheet 1

Inventor:
Albert W. Wigglesworth
By Bertha L. MacGregor
Attorney.

Aug. 18, 1942.   A. W. WIGGLESWORTH   2,293,375
AUTOMATIC BRAKE
Filed May 17, 1941   3 Sheets-Sheet 2
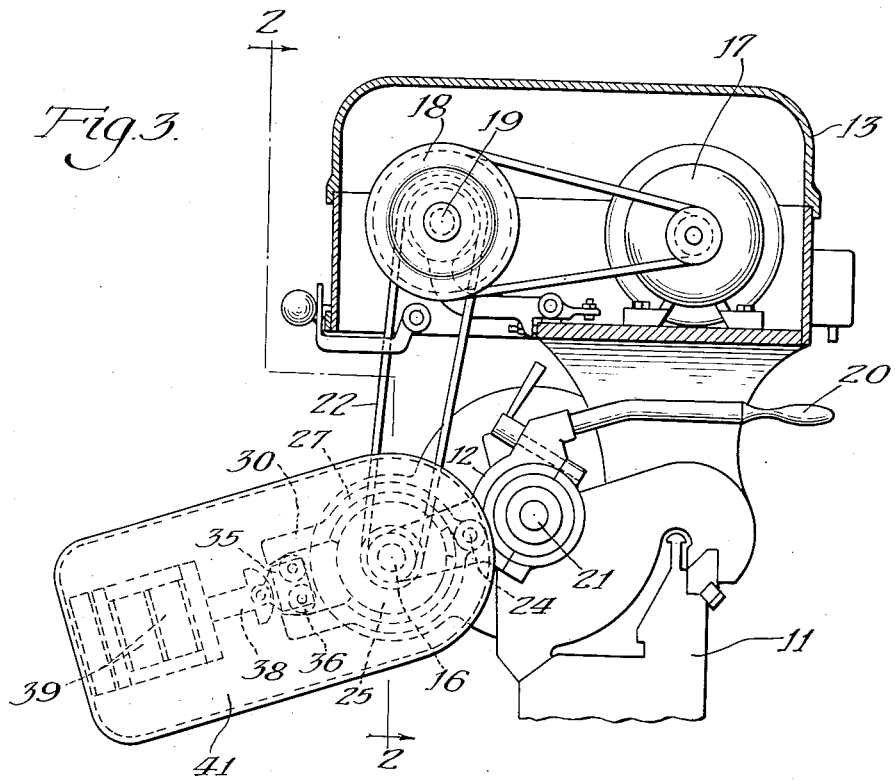
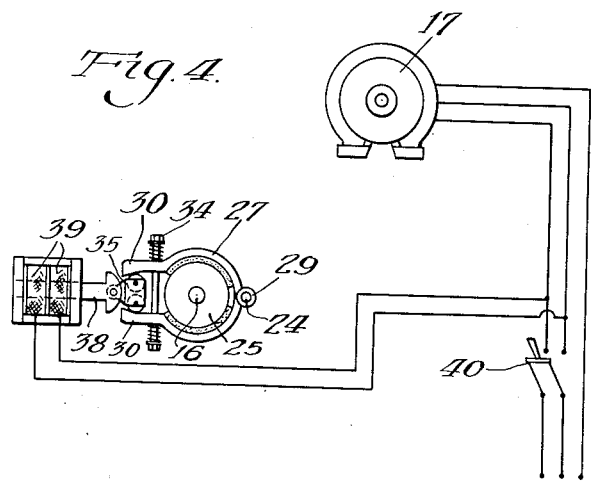

Aug. 18, 1942.　　　A. W. WIGGLESWORTH　　　2,293,375
AUTOMATIC BRAKE
Filed May 17, 1941　　　3 Sheets-Sheet 3
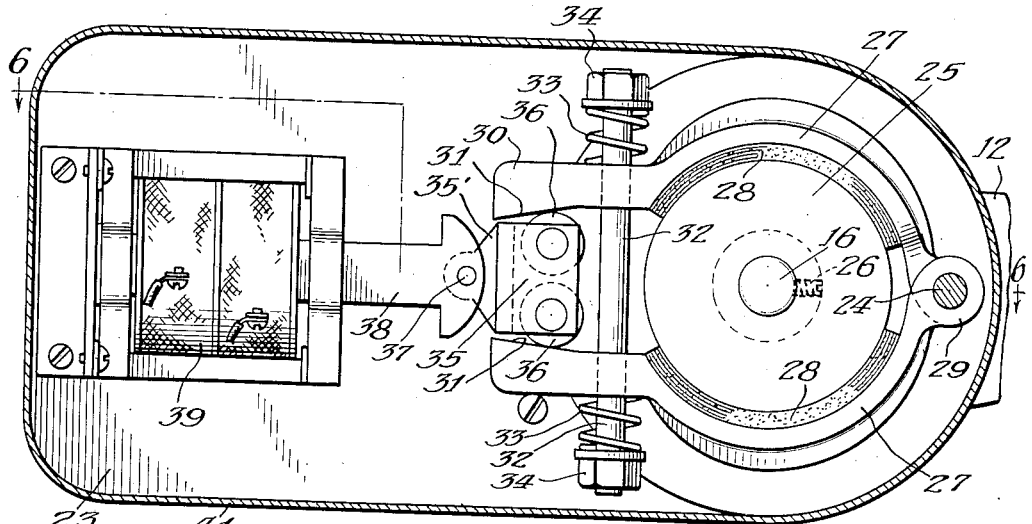
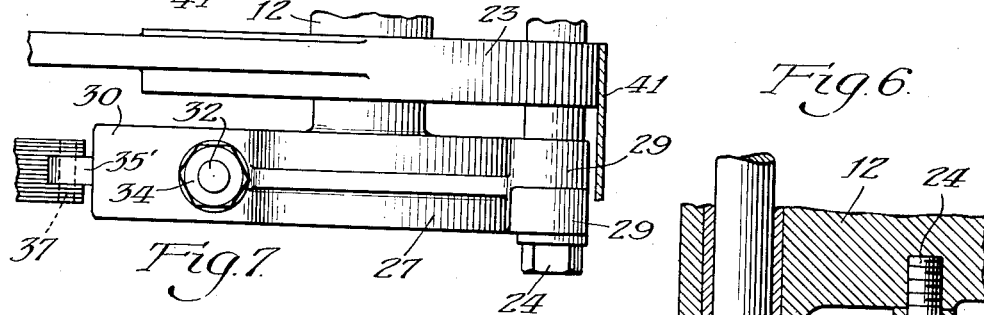
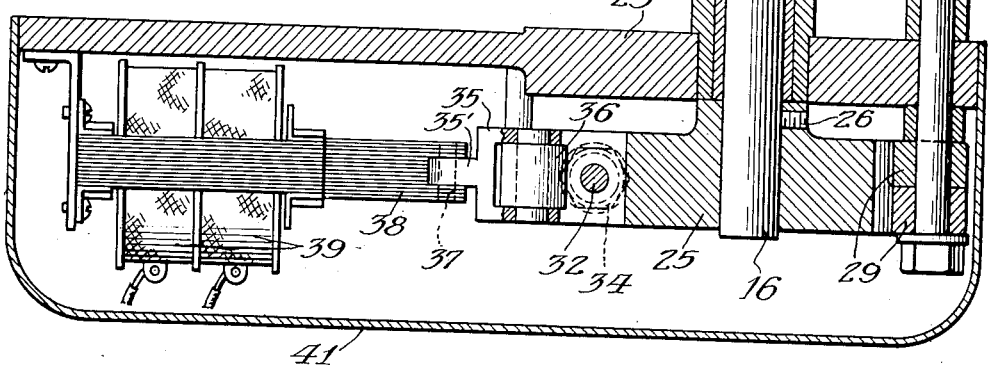
Inventor:
Albert W. Wigglesworth
By Bertha L. MacGregor
Attorney.

Patented Aug. 18, 1942

2,293,375

UNITED STATES PATENT OFFICE 2,293,375

AUTOMATIC BRAKE

Albert W. Wigglesworth, Miami Beach, Fla., assignor to Hill-Clarke Machinery Co., Chicago, Ill., a corporation of Illinois Application May 17, 1941, Serial No. 393,919

3 Claims. (Cl. 51—237)

This invention relates to automatic brakes, and particularly to brakes for automatically stopping the rotation of motor driven revolving work headstocks.

My invention is especially adapted for and herein shown as applied to a grinding machine headstock such as is shown and described in my United States Letters Patent No. 2,095,039, but obviously the automatic brake of my invention may be applied to many other machines in which it is desired to automatically instantly stop the rotation of motor driven revolving shafts or parts.

The main object of the invention is to provide a brake mechanism which automatically frictionally engages the motor driven shaft or part to be rendered motionless, simultaneously with the cutting off of the electric current to the motor, said brake mechanism being automatically released when the motor is started.

Heretofore, in the operation of grinding machines having motor driven headstocks, the momentum of the motor shaft and the shafts driven thereby was such as to cause the work to be revolved for some moments after the motor current had been cut off, resulting in substantial loss of time in removing the finished work. By means of the brake mechanism herein disclosed, the rotation of the motor driven shaft and the work is automatically stopped simultaneously with the operation of the switch which cuts off the motor current. Consequently the finished work can be removed and new work mounted in the machine without loss of time.

In the drawings:

Fig. 3 is an end elevation, partly in transverse vertical section, taken in the plane of the line 3—3 of Fig. 1.

Fig. 4 is a diagrammatic view of the automatic brake and motor circuit of my invention.

Fig. 5 is an elevational view of the brake mechanism, on an enlarged scale, the casing being in section.

Fig. 6 is a plan view, partly in section, of the brake mechanism, the section being taken in the plane of the line 6—6 of Fig. 5.

Fig. 7 is a plan view of the right hand portion of the brake mechanism as shown in Fig. 5.

Figure 1:
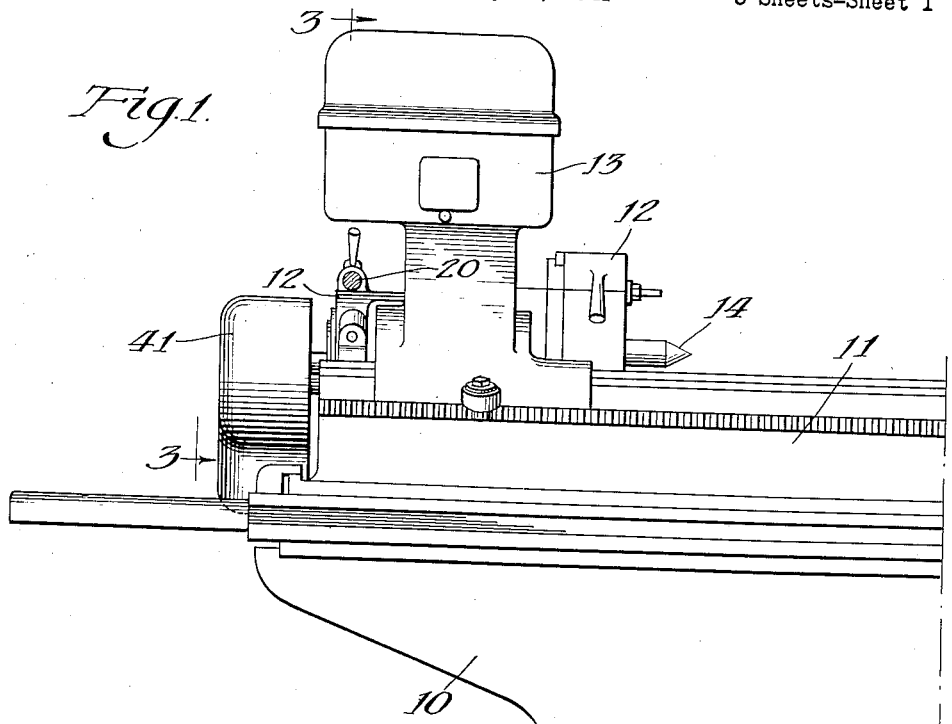
Fig. 1 is a front elevation of the headstock end portion of a grinding machine to which my automatic brake has been applied.
Figure 2:
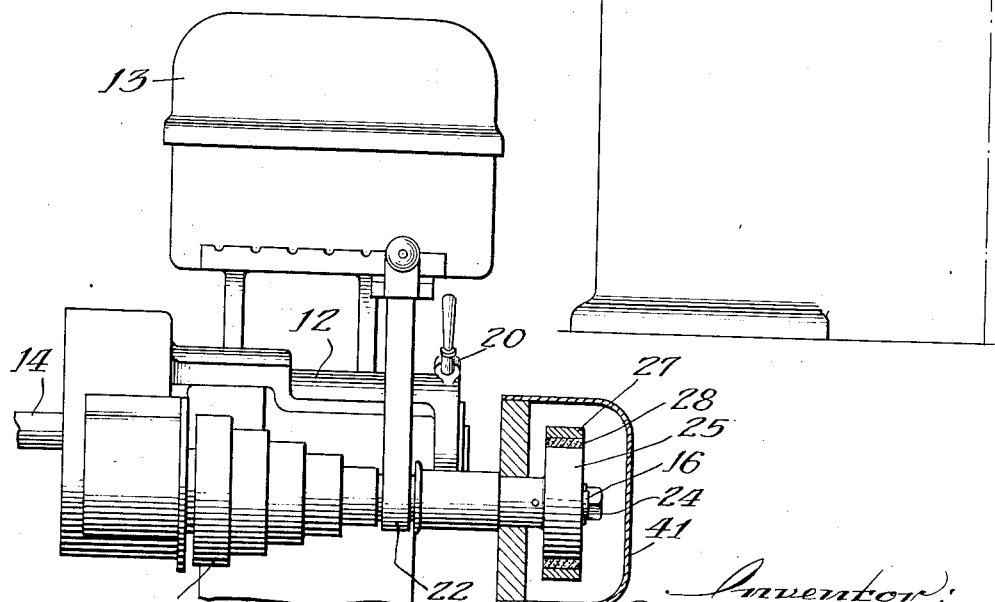
Fig. 2 is a rear elevation, partly in section, taken in the plane of the line 2—2 of Fig. 3.

In that embodiment of the invention shown in the drawings, my automatic brake is applied to the change speed pulley shaft of the motor driven headstock of a grinding machine. The machine comprises a base 10, longitudinally movable work carriage 11, headstock housing 12, motor and pulley housing 13, work holding spindle 14, and change speed pulley 15 on shaft 16. Within the housing 13 is a motor 17 which drives the shaft 16 through the pulley 18 on shaft 19. A handle 20 is rigidly connected to the housing 12 and is used to move the housing pivotally about the point 21 when it is desired to lower or raise the change speed pulley 15 and shaft 16 for the purpose of adjusting the belt 22 on said change speed pulley, as shown in Figs. 2 and 3.

From the foregoing it will be understood that the motor 17 drives the shaft 16 through the pulley 18, shaft 19 and belt 22, and that the shaft 16 is operatively connected, through means in the housing 12, with the work revolving part of the headstock. The brake mechanism about to be described is mounted in such manner that it engages and disengages the shaft 16 and thus controls the spindle 14.

The automatic brake mechanism of my invention is mounted on a plate 23 which is secured by the bolt 24 to the headstock housing 12 so as to move with the housing when the latter is moved, as explained, for adjustment of the belt 22 on the change speed pulley 15. The pulley shaft 16 extends through the plate 23 and has a brake drum 25 fixed on its free end by a set screw 26, as best shown in Figs. 5 and 6. The brake drum 25 is adapted to be frictionally engaged by a pair of brake bands or curved arms 27, 27, provided with brake linings 28, 28, which embrace the upper and lower peripheral surfaces, respectively, of the brake drum 25 on shaft 16. The brake bands 27 are cut away vertically at one end to provide eyeletted members 29, 29 narrower in width than the bands proper, so that said members 29 can be mounted pivotally, in axial alignment, on the bolt 24. Thus the bands 27 are vertically aligned and movable toward and away from each other about the pivotal point 24.

The brake bands 27, at their ends opposite the pivotal mounting 24, have arms 30 which are spaced apart and substantially parallel with each other, and provided with oppositely inclined surfaces 31 on their proximate inner surfaces. A bolt 32 extends through apertures in said arms 30 adjacent the bands 27, and coiled springs 33 compressed between the nuts 34 and arms 30 tend to urge the arms 30 toward each other and thereby move the brake bands 27—28 into braking position on the drum 25, as shown in Fig. 5.

The means for moving the brake bands into non-braking position comprise a spacer block 35 and yoke 35' in which are mounted roller bearings 36, said yoke being pivotally connected by a pin 37 to a plunger 38 actuated by a solenoid 39 fixedly mounted on the plate 23. The solenoid is electrically connected in the circuit of the motor 17, as indicated in Fig. 4. When the solenoid is energized, that is, when the switch 40 is closed, and the motor 17 is running, the plunger 38 is retracted by the solenoid and the spacer block 35 is drawn toward the free ends of the arms 30, causing the bearings 36 to engage the inclined surfaces 31 and forcing the arms 30 apart and the brake bands 27—28 away from the drum 25. When the motor 17 is cut off and the solenoid is de-energized, as when the switch 40 is open, as shown in Fig. 4, the parts assume the position shown in Figs. 5 and 6, wherein the springs 33 have urged the arms 30, 30 toward each other and caused the spacer bearings 36 to move inwardly from the free ends of the arms 30.

The operation of the brake will be understood from the foregoing description. When the work revolving part of the headstock is being driven by the motor 17 through intermediate shaft 16, the solenoid will be energized and the brake bands 27—28 will be inoperative, but instantaneously after the motor current has been cut off by actuating the switch 40, the brake bands automatically embrace the drum 25 (or other part with which they may be associated) and stop the rotation of the shaft 16 and of the work revolving part of the headstock.

The brake mechanism may be covered by a guard 41 which cooperates with the plate 23 to enclose the parts.

Changes may be made in details of construction without departing from the scope of my invention.

I claim:

1. The combination of an electric motor driven headstock including a headstock housing, a revolving shaft extending through said housing and rotatably connected to said headstock, a brake mechanism mounting plate connected to the housing by means including a bolt, said revolving shaft extending also through the plate, a brake drum on one end of said shaft, brake mechanism pivotally mounted on said bolt in position to embrace the drum, a solenoid mounted on the plate and electrically connected in the motor circuit, means actuated by the solenoid to move the brake mechanism to non-braking position relatively to the drum when the solenoid is energized by the motor current, and means mounted on the brake mechanism for moving said mechanism to braking position when the solenoid is de-energized, the headstock housing being pivotally mounted about the horizontal axis of the headstock.

2. The combination of an electric motor driven headstock including a headstock housing and a work holding spindle extending through said housing, a revolving shaft driven by the motor and rotatably connected to said headstock, a brake mechanism mounting plate connected to the housing to one side of said spindle, said revolving shaft extending through the plate, a brake drum on one end of said shaft, a change speed pulley on the other end of the shaft, brake mechanism pivotally mounted on said plate in position to embrace the drum, a solenoid mounted on the plate and electrically connected in the motor circuit, means actuated by the solenoid to move the brake mechanism to non-braking position relatively to the drum when the solenoid is energized by the motor current, and means mounted on the brake mechanism for moving said mechanism to braking position when the solenoid is de-energized, said plate with the brake mechanism mounted thereon and said headstock housing being pivotally movable about the horizontal longitudinal center of said spindle.

3. In combination with an electric motor and a motor driven revolving shaft, brake mechanism for automatically arresting rotation of the shaft when the motor current is cut off, said brake mechanism comprising a brake drum secured to the shaft, a pair of drum engaging brake bands pivotally connected adjacent the periphery of said drum and at one side of said shaft, said brake bands including arcuate drum engaging portions and elongated substantially parallel arms at the opposite side of said shaft, said arms having opposed surfaces oppositely inclined outwardly from their free ends toward said drum, a solenoid electrically connected to the motor circuit and having its axis in the central plane of said drum and substantially in a line extending through the axes of said shaft and pivotal connection, a spacer disposed between said arms and provided with rollers engaging said inclined surfaces, a plunger connected with said solenoid and pivotally connected with said spacer, a bolt extending through said arms between said drum and spacer, and springs in compression between nuts on opposite ends of the bolt and said arms for moving said brake bands into braking engagement with said drum and through said inclined surfaces moving said spacer toward said drum when the motor current is cut off, said spacer being moved away from said drum through energization of said solenoid when the motor current is turned on to move said bands away from said drum.

ALBERT W. WIGGLESWORTH.